United States Patent [19]

Tangren

[11] Patent Number: 5,796,553
[45] Date of Patent: Aug. 18, 1998

[54] DISK DRIVE HEAD SUSPENSION HAVING GAPS IN THE LOAD BEAM WHICH ARE AT LEAST PARTIALLY FILLED WITH OR COVERED BY DAMPING MATERIAL

[75] Inventor: John H. Tangren, St. Paul, Minn.

[73] Assignee: Hutchinson Technology Incorporated, Hutchinson, Minn.

[21] Appl. No.: 829,222

[22] Filed: Mar. 31, 1997

[51] Int. Cl.$^6$ ........................................ G11B 5/48
[52] U.S. Cl. ........................................ 360/104
[58] Field of Search ........................ 360/104, 97.02

[56] References Cited

U.S. PATENT DOCUMENTS

| | | | |
|---|---|---|---|
| 3,713,121 | 1/1973 | Fasano et al. | 340/174 |
| 4,208,684 | 6/1980 | Janssen et al. | 360/104 |
| 4,447,493 | 5/1984 | Driscoll et al. | 428/332 |
| 4,760,478 | 7/1988 | Pal et al. | 360/104 |
| 4,819,094 | 4/1989 | Oberg | 360/104 |
| 4,905,111 | 2/1990 | Tuma et al. | 360/126 |
| 5,079,660 | 1/1992 | Yumura et al. | 360/104 |
| 5,118,562 | 6/1992 | Johnson et al. | 428/327 |
| 5,187,625 | 2/1993 | Blaeser et al. | 360/104 |
| 5,299,081 | 3/1994 | Hatch et al. | 360/104 |
| 5,530,606 | 6/1996 | Baasch | 360/103 |
| 5,623,758 | 4/1997 | Brooks | 360/104 |

FOREIGN PATENT DOCUMENTS

| | | |
|---|---|---|
| 0 121 057 | 10/1984 | European Pat. Off. |
| 0 617 411 A2 | 9/1994 | European Pat. Off. |
| 56-19554 | 2/1981 | Japan . |
| 57-105860 | 7/1982 | Japan . |
| 8203190 | 9/1996 | Japan . |

*Primary Examiner*—A. J. Heinz
*Attorney, Agent, or Firm*—Faegre & Benson

[57] ABSTRACT

A disk drive suspension for mounting to the end of an actuator arm including a load beam having a rigid region, a base on a proximal of the load beam, and a flexure for receiving and supporting a read/write head on a distal end of the load beam. Gaps are cut out of high strain regions of the rigid region of the load beam and filled with damping material. The damper filled gaps reduce the amplitude of resonant frequency vibrations in the disk drive suspension.

19 Claims, 7 Drawing Sheets

5,796,553

DISK DRIVE HEAD SUSPENSION HAVING GAPS IN THE LOAD BEAM WHICH ARE AT LEAST PARTIALLY FILLED WITH OR COVERED BY DAMPING MATERIAL

BACKGROUND OF THE INVENTION

1. Field of the Invention

The present invention relates generally to suspensions for supporting read/write heads over recording media. In particular, the present invention is a head suspension having damping structures.

2. Description of the Related Art

Magnetic head suspension assemblies (HSAs) are well known and commonly used with dynamic magnetic storage devices or drives with rigid disks. The HSA is a component within the disk drive which positions a magnetic read/write head over the desired position on the storage media where information is to be retrieved or transferred.

With the advent of more powerful computers and the rapid growth in the personal computer market it has become increasingly more important to enable the user to access data from storage devices with increased speed and accuracy.

Because of this need to reduce access times to enable rapid retrieval of data it has become increasingly more important to reduce undesirable levels of vibration of components within the rigid disk drive. In relation to this, an important consideration in the design of HSAs is resonance characteristics. Resonance characteristics of drive components can cause instability of the drive's servo system. It also may delay the transfer of data because the data cannot be confidently transferred until the amplitude of the vibration has substantially decayed.

Of particular importance are the torsional modes and lateral bending (or sway) modes. These resonant modes can result in lateral movement of the head slider at the end of the head suspension assembly and are dependent on cross-sectional properties along the length of the load beam. Torsional modes sometimes produce a mode shape in which the tip of the resonating suspension assembly moves in a circular fashion. However, since the head slider is maintained in a direction perpendicular to the plane of the disk surface by the stiffness of the applied spring force acting against the air bearing, lateral motion of the rotation is seen at the head slider. The sway mode has primarily lateral motion.

The use of dampers on HSAs to decrease resonant motion is generally known and described in U.S. Pat. No. 5,187,625 issued to Blaeser et al. on Feb. 16, 1993 or U.S. Pat. No. 5,299,081 issued to Hatch et al. on Mar. 29, 1994.

There is, however, a continuing need for improved damping of HSAs. In particular, addition of damper material to a load beam should change as little as possible the properties of the load beam (e.g. gram loading, spring rate, shock performance, etc.). Further, it is advantageous if the method of damping can be used on a variety of HSA designs. Additionally, the damped suspension should be reliable and capable of being efficiently manufactured.

SUMMARY OF THE INVENTION

The present invention is a reliable, efficient to manufacture suspension having damping structures. Accordingly, the invention includes a load beam with a proximal end, a distal end, a mounting region on the proximal end, and a rigid region. A flexure is mounted at the distal end of the load beam and is configured for receiving and supporting a read/write head. At least a single gap extends through a portion of the load beam. Damping material is located in the gap for damping vibrations in the suspension. In one embodiment, gaps with viscoelastic damping material are located in stiffening rails on opposite edges of the rigid region.

DETAILED DESCRIPTION OF THE PREFERRED EMBODIMENT

Figure 1:
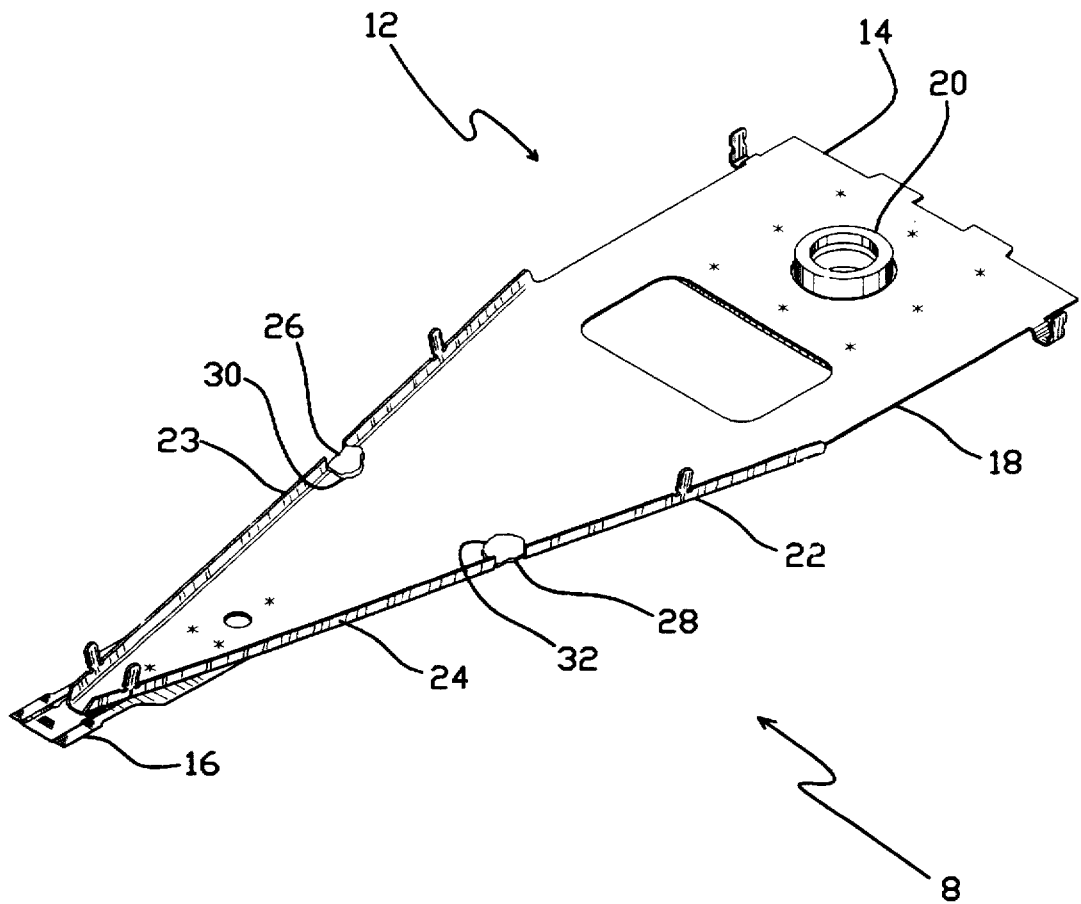
FIG. 1 is an isometric view of a first embodiment of the present invention showing a load beam including gaps cut from edge rails and damping material inserted into the gaps.

A magnetic head suspension assembly 8, a first embodiment of the present invention, is shown in FIG. 1. Head suspension 8 includes a load beam 12 having a base or mounting region 14 on a proximal end, a flexure 16 on a distal end, a relatively rigid region 22 adjacent to the flexure, and a radius or spring region 18 between the base 14 and rigid region 22. A baseplate 20 is welded to base 14 for mounting the suspension 8 to a disk drive actuator arm (not shown). First and second edge rails 23 and 24 are formed in transversely opposite sides of the rigid region 22. Load beam 12 can be fabricated and formed from a sheet of stainless steel or other resilient material in a conventional manner.

A spring connection is provided between a head slider (not shown) and the distal end of the load beam 12 by flexure 16 which permits the head slider to move in pitch and roll directions so that it can compensate for fluctuations of a spinning disk surface above which the slider 16 "flies." Many different types of flexures, also known as gimbals, are known to provide the spring connection allowing for pitch and roll movement of the head slider and are contemplated to be used with the present invention.

Figure 1A:
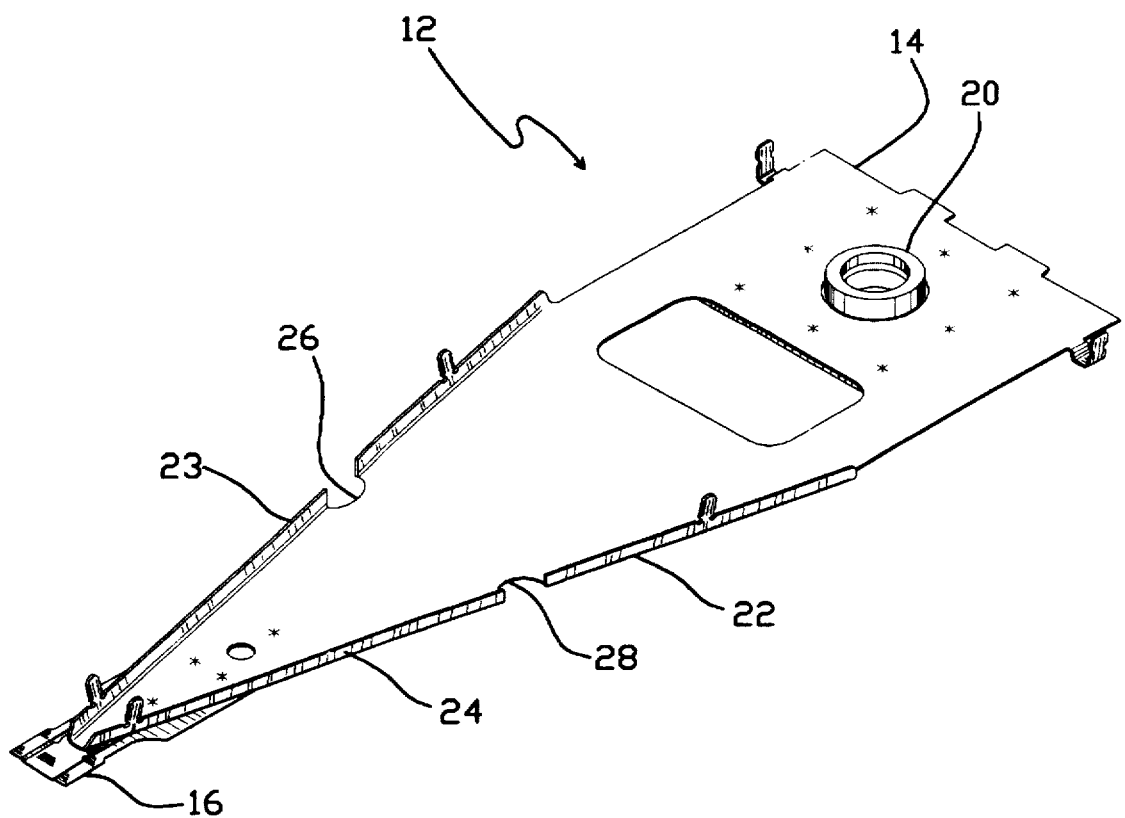
FIG. 1a is an isometric view of the load beam shown in FIG. 1 showing the gaps cut from the edge rails without damping material inserted into the gaps.

Load beam 12 is provided with damping material to diminish unwanted vibrations. As shown in FIG. 1a, first gap 26 is formed in edge rail 23 and a second gap 28 is formed in edge rail 24. First gap 26 and second gap 28 are formed by etching or any method known in the art. In the embodiment shown in FIGS. 1 and 1a, first and second gaps 26 and 28, respectively, also extend slightly into the rigid region 22 of the load beam 12. As shown in FIG. 1, first damper plug 30 is inserted into first gap 26 and second damper plug 32 is inserted into second gap 28. In order to compensate for the lower stiffness of the damper material than load beam material, damper plugs 30 and 32 can be of greater volume than the load beam material removed to form gaps 26 and 28. In the embodiment of FIG. 1, damper plugs 30 and 32 are manufactured from viscoelastic material (such as epoxy) which can be dispensed directly into gaps 26 and 28 and adheres to the edges of load beam 12 within the gaps 26 and 28. Also, an outer surface of the viscoelastic material is exposed, that is, there is no type of added constraint member layered over the exterior of the damping material. A variety of suitable viscoelastic materials are available from a number of suppliers such as Minnesota Mining and Manufacturing Company (3M) of St. Paul, Minn. and Loctite Corp. of Rocky Hill, Conn. It is within the ambit of the present invention to use any type of damper material provided it has a higher damping coefficient than the load beam material removed to form the gaps. Any material having relatively high damping characteristics with respect to the material that was removed will enhance the performance of the suspension. Particularly desirable damping materials will also have minimal outgassing and exhibit high damping rates over the drive operating range. Desirable properties of viscoelastic materials suitable for use with the invention are, for example, disclosed in the Driscoll et al. U.S. Pat. 4,447,493.

The effect of manufacturing a load beam with damper material is the reduction of undesirable levels of vibration in the head suspension assembly which, as explained above, may have detrimental effects on the read/write processes. Damper material reduces vibrations by changing strain energy (deflection) into heat. It follows that the greater the strain the more heat generated and the greater the damping capability. Thus, it is advantageous to locate the damper in a region of high strain on the load beam. Areas of high strain will vary depending on the load beam design. Where such areas exist for a given load beam design, however, can be determined either empirically or by using known methods of finite element analysis for computer modeling of load beam characteristics. On load beam 12 of FIG. 1, edge rails 23 and 24 comprise such a high strain location and placing damper filled gaps in edge rails 23 and 24 serves to damp resonance modes.

As described above, the damping of the current invention can be used to damp all resonant modes. It can also be used to damp any individual resonant mode including any bending, torsion, or sway mode resonance. Either empirically or by using methods of finite element analysis known in the art, it is possible to determine the location of high strain areas on the load beam corresponding to any individual resonant mode. By placing damper material filled gaps in these locations, the off-track and other motion of the head slider produced by specific resonant modes can be damped.

Since the removal of rails 23 and 24 is localized and the viscoelastic damper plugs 30 and 32 act as structural members, the natural resonant frequencies and other characteristics of the load beam 12 (i.e. spring rate, shock performance, etc.) are not greatly effected by the formation of the gaps 26 and 28 and insertion of damper plugs 30 and 32.

Figure 2A:
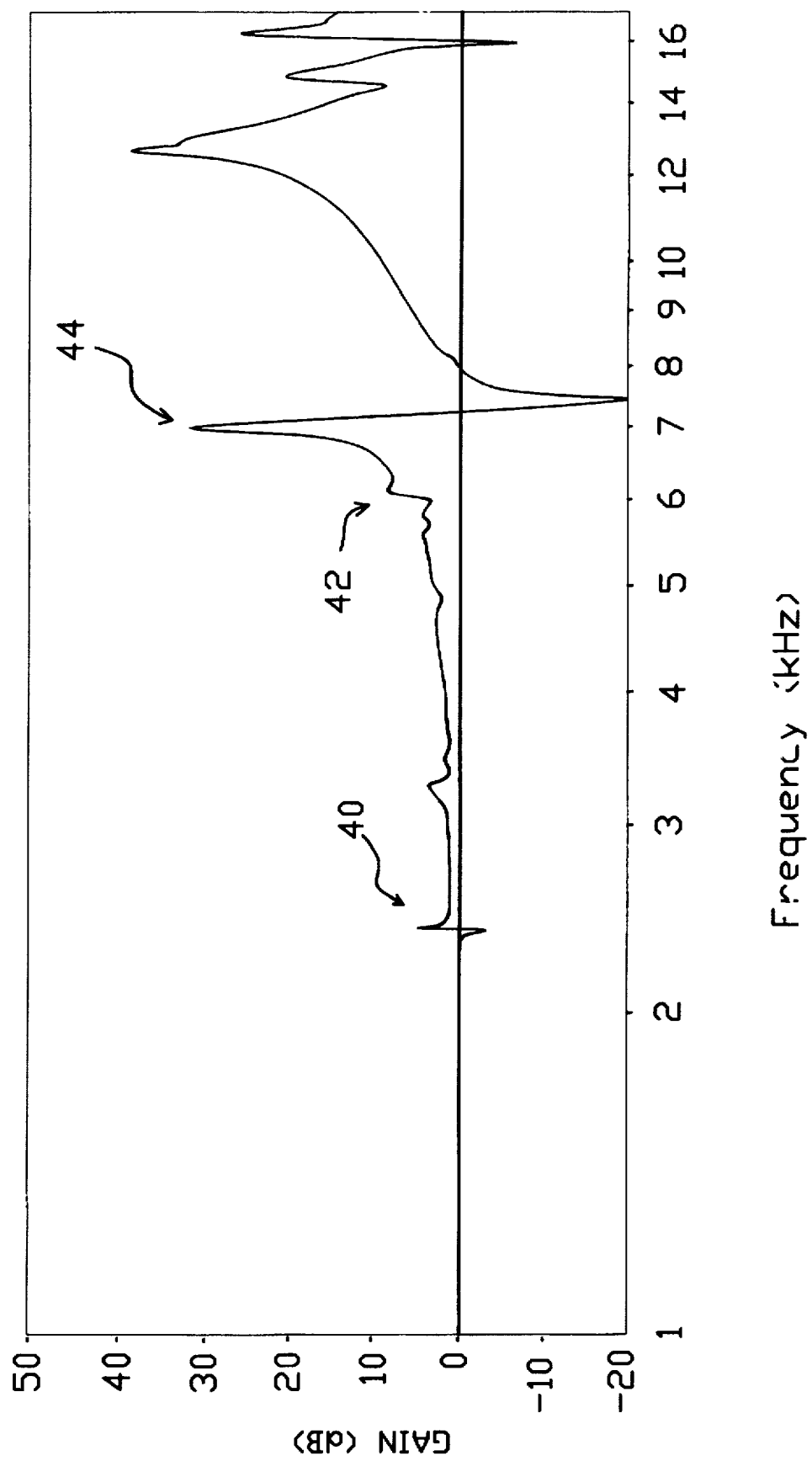
FIG. 2a is graph of frequency input at the base of a load beam versus gain in amplitude at the flexure for a load beam of the type shown in FIG. 1 without the gaps or damping material.
Figure 2B:
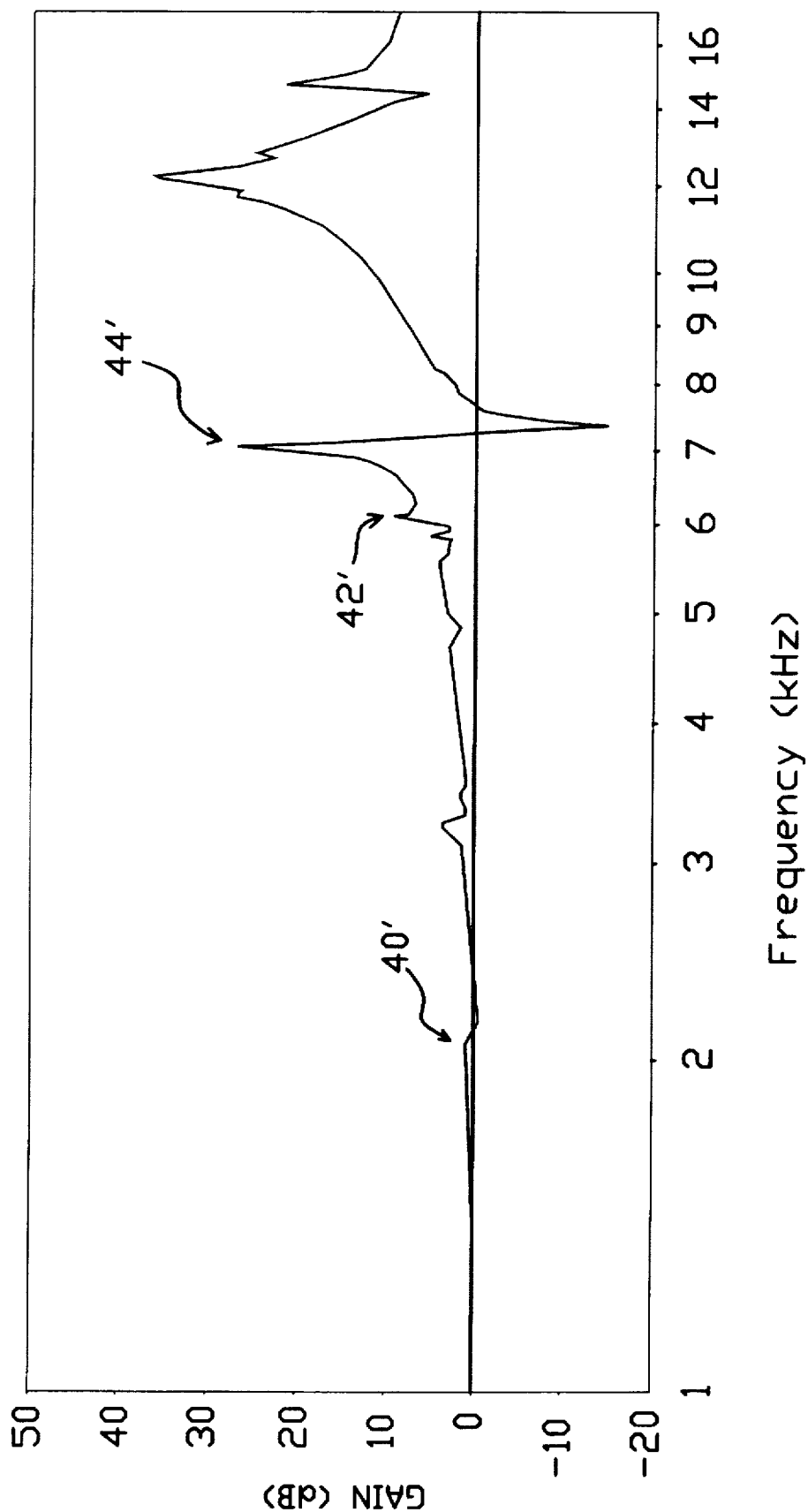
FIG. 2b is a graph of frequency input at the base of a load beam versus gain in amplitude at the flexure for the load beam shown in FIG. 1.

The effect of the addition of damper plugs to load beam 12 can be seen in FIGS. 2a and 2b. FIGS. 2a and 2b show graphs of frequency input at the base of a load beam versus the gain of the relative motion of the slider. The load beam used is a Hutchinson Technology Type 8 load beam available from Hutchinson Technology Incorporated located in Hutchinson, Mont. FIG. 2a shows the response of the load beam without the gaps 26 and 28 and without the damper plugs 30 and 32. FIG. 2b shows the response of the load beam with damping in accordance with the present invention, specifically, load beam 12 of FIG. 1. The load beam without added damping (FIG. 2a) shows a first torsion resonance 40 at 2392 Hz of about 6.65 dB. However, the load beam with damping in accordance with the present invention shows a first torsion resonance 40' at 2045 Hz of only about 0.70 dB. FIG. 2a then shows a second torsion resonance 44 at 6990 Hz of about 39.91 dB while second torsion resonance 44' of FIG. 2b occurs at 7062 Hz and has an amplitude of only about 25.88 Hz. Thus, particularly in the region below 3000 Hz, the addition of gaps 26 and 28 and damper plugs 30 and 32 decrease the gain of resonant vibrations in load beam 12.

Load beams such as 12 are typically manufactured from a single sheet of stainless steel or other similar material using methods known in the art. Blanks are chemically etched to the appropriate dimensions, the blanks are then formed to provide a spring region 18, and edge rails 23 and 24 are formed. Gaps 26 and 28 can be formed prior to forming the load beam or they can be mechanically cut after forming by etching or other methods known in the art. Viscoelastic material is then dispensed into gaps 26 and 28 or inserted therein using any method known in the art.

Figure 3:
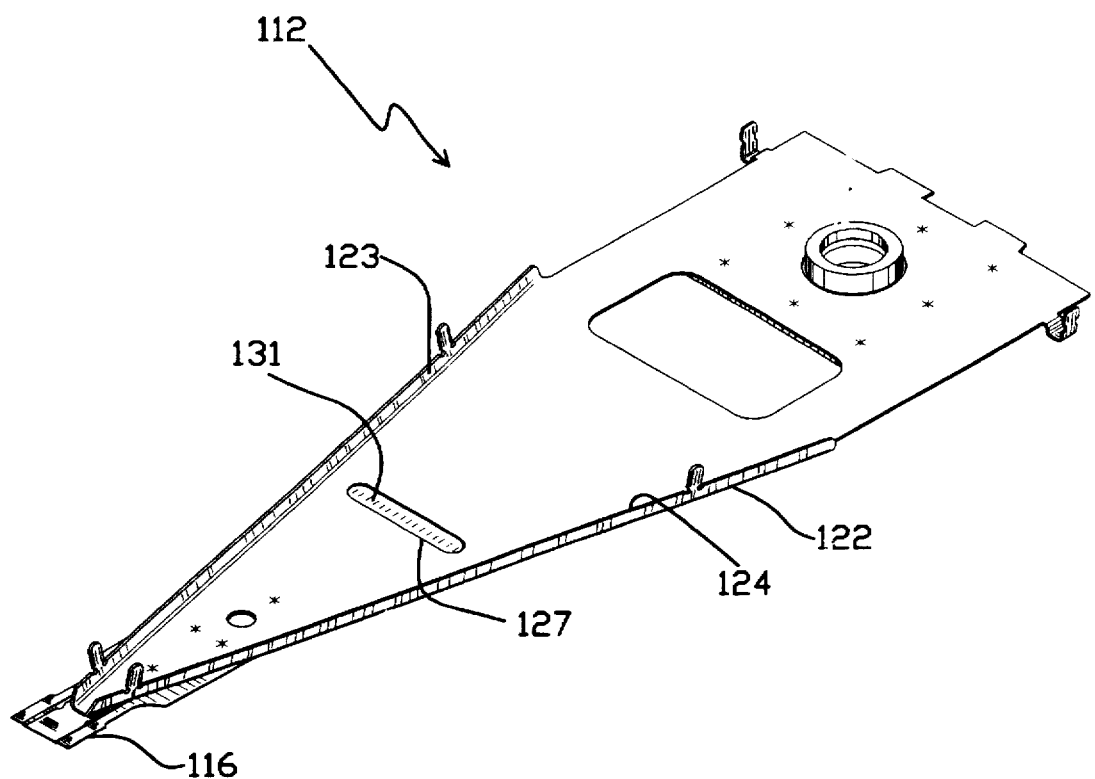
FIG. 3 is an isometric view of a second embodiment of the present invention showing a load beam including a transversely extending gap and damping material inserted into the gap.
Figure 4:
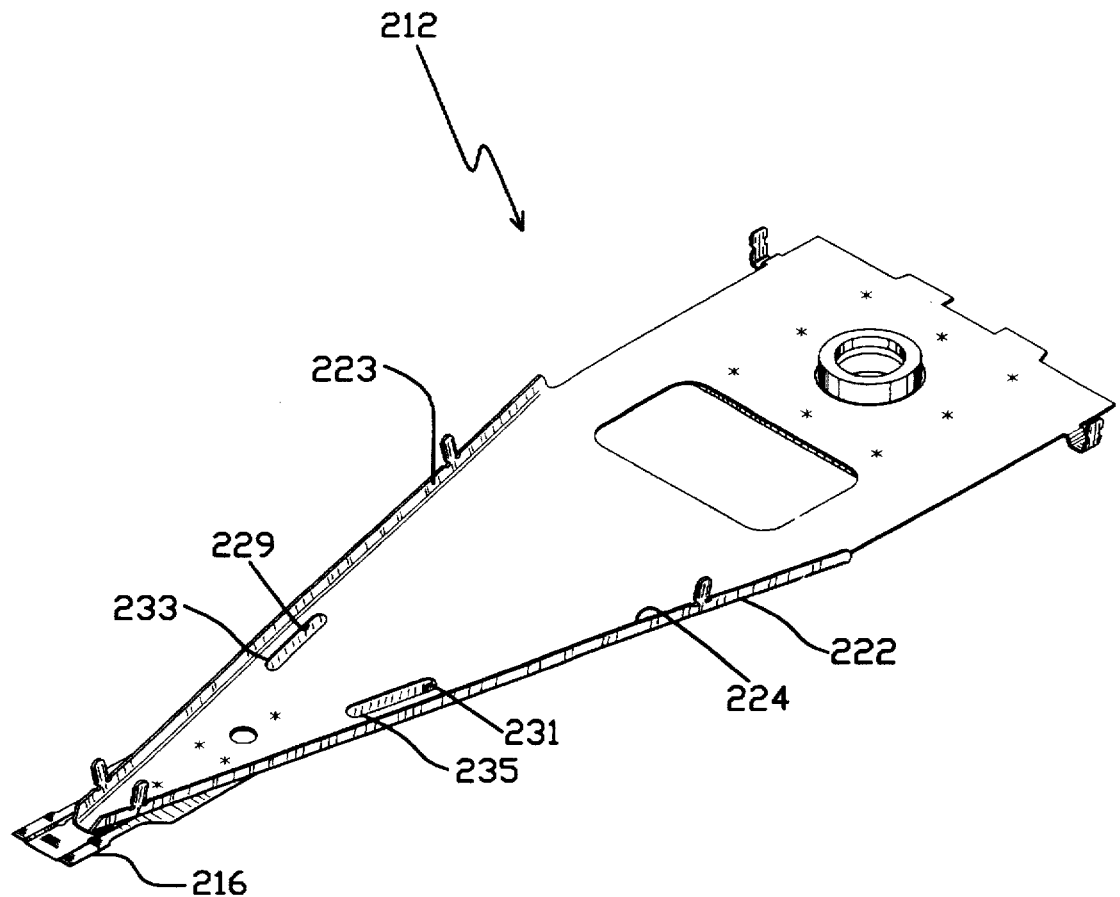
FIG. 4 is an isometric view of a third embodiment of the present invention showing a load beam including two longitudinally extending gaps and damping material inserted into the gaps.

The edge rails 23 and 24 are not the only high strain locations on the load beams such as load beam 12 suitable for placement of damper material. Two other embodiments of the present invention with damper material placed at other high strain locations are shown in FIGS. 3 and 4. Components in FIGS. 3 and 4 identical to components shown in FIG. 1 are indicated by like numerals incremented, respectively, by 100 and 200. The load beam 112 shown in FIG. 3 is similar to that shown in FIG. 1 with the exception that no gaps are formed in the edge rails 123 and 124 and a transversely extending gap 127 is formed centrally in the rigid region 122. Damper plug 131 is inserted into gap 127. The load beam 212 shown FIG. 4 is also similar to that of FIG. 1 with the exception that rather than gaps 26 and 28 formed, respectively, in edge rails 23 and 24, load beam 212 has first and second longitudinally extending gaps 229 and 231, respectively, formed in the rigid region of the load beam. First damper plug 233 is inserted into first gap 229 and second damper plug 235 is inserted into second gap 231.

Figure 5:
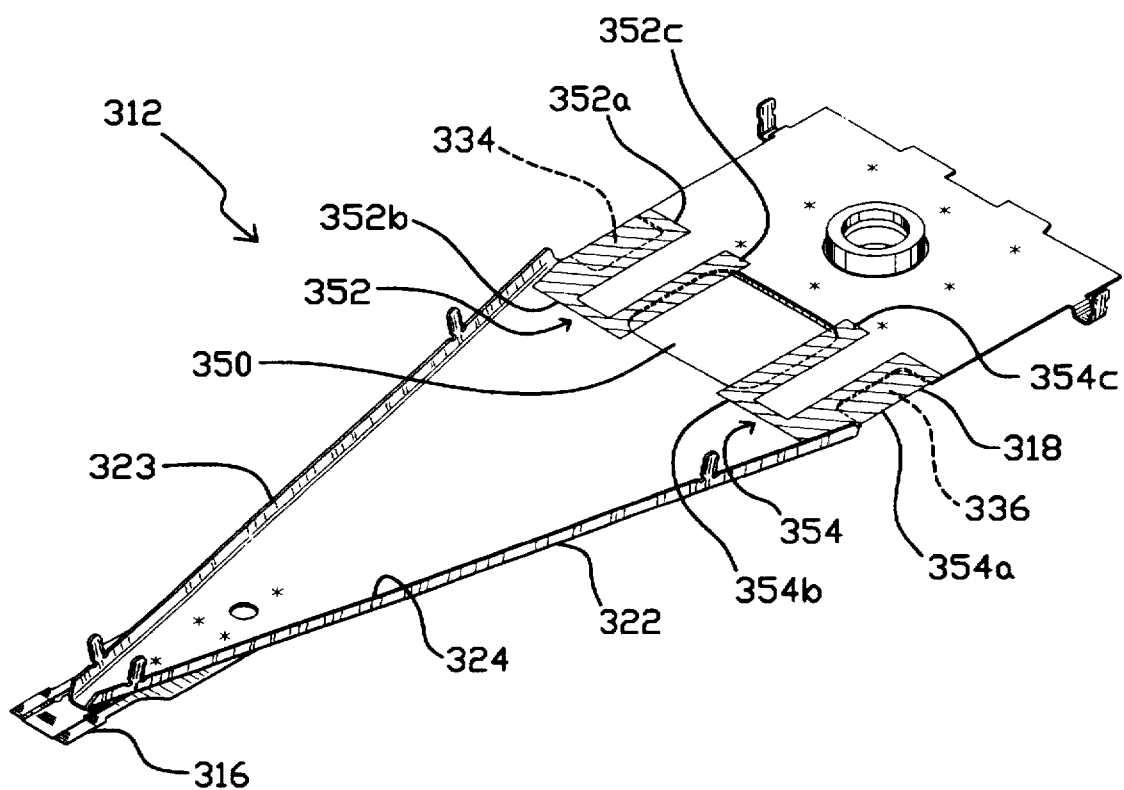
FIG. 5 is an isometric view of a fourth embodiment of the invention showing a load beam including two gaps covered by polyimide damping pat 5.

Yet another embodiment of the present invention is shown in FIG. 5. Components in FIG. 5 identical to those shown in FIG. 1 are indicated by like numerals incremented by 300. Rather than forming gaps in the rigid region 322 of load beam 312, a first rectangular gap 334 and secondrectangular gap 336 are formed in the edges of a spring region 318 of load beam 312 on either side of aperture 350, also formed the spring region 318. A first damper including a first generally U-shaped patch 352 has a first arm 352a that extends over first gap 334, a base 352b that extends transversely from first gap 334 to aperture 350, and a second arm 352c that extends over a lateral portion of aperture 350. A second damper including a second generally U-shaped patch 354 also has a first arm 354a that extends over second gap 336, a base 354b that extends transversely from second gap 336 to aperture 350, and a second arm 354c that extends over a lateral portion of aperture 350.

In the embodiment shown in FIG. 5, damper patches 352 and 354 are formed of polyimide. However, it is within the ambit of the present invention to form patches 352 and 354 from any resilient material having an elastic modulus below that of the material forming the remainder of the load beam, e.g. stainless steel (as well as higher damping characteristics).

Load beam 312, gaps 334 and 336, and aperture 350 can be formed as described above with respect to load beam 12 and gaps 26 and 28 shown in FIG. 1. Polyimide patches 352 and 354 can then be attached to load beam 312 by adhesive or any means known in the art. Alternatively, load beam 312 can be formed from a sheet of laminated material having a first layer of stainless steel or other resilient material and a second layer of polyimide. Blanks having the dimensions of load beam 312 can be cut from the sheet of material and the layers of the laminated material can be chemically etched to form patches 352 and 354, gaps 334 and 336, and aperture 350. Side rails 323 and 324 can then be formed.

Though the present invention has been described with reference to preferred embodiments, those skilled in the art will recognize that changes can be made in form and detail without departing from the spirit and scope of the invention.

What is claimed is:

1. A disk drive suspension comprising:
   a load beam having a proximal end, a distal end, a mounting region on the proximal end, and a rigid region;
   a flexure at the distal end of the load beam, the flexure configured for receiving and supporting a read/write head;
   at least one gap in the load beam and extending entirely through the load beam in a portion of the load beam; and
   unconstrained damping material extending at least partially over the area of the gap having a higher damping coefficient than material of the load beam surrounding the gap and for damping vibration in the suspension.

2. The disk drive suspension of claim 1 wherein:
   the load beam includes a spring region between the mounting region and the rigid region; and
   the at least one gap is formed in the spring region and includes damper material thereat.

3. The disk drive suspension of claim 1 wherein the damping material includes viscoelastic damping material.

4. The disk drive suspension of claim 3 wherein the viscoelastic damping material includes viscoelastic epoxy.

5. The disk drive suspension of claim 3 wherein the load beam further includes stiffening rails formed in opposite edges of the rigid region, and the at least one gap includes at least one gap extending through each stiffening rail with damping material located in each gap.

6. The disk drive suspension of claim 3 wherein the load beam further includes a pair of opposite edges in the rigid region and the at least one gap includes an aperture positioned between the opposite edges, the aperture having damping material located therein.

7. The disk drive suspension of claim 3 wherein the at least one gap includes first and second longitudinally extended gaps located in the rigid region of the load beam and each gap has damping material located therein.

8. The disk drive suspension of claim 1 wherein:
   the load beam includes a spring region between the rigid region and mounting region and having an aperture formed in a transverse center thereof;
   the at least one gap includes first and second gaps formed in opposite edge of the spring region; and
   a generally U-shaped first damper patch is placed over the first gap and a first portion of the aperture and a generally U-shaped second damper patch is placed over the second gap and second portion of the aperture.

9. The disk drive suspension of claim 8 wherein the first and second damper patches are fabricated from polyimide.

10. A method of manufacturing a disk drive suspension comprising the steps of:
    a) fabricating a load beam having a proximal end, a distal end, a mounting region the proximal end, and a rigid region;
    b) locating a flexure at the distal end of the load beam, the flexure configured for receiving and supporting a read/write head;
    c) removing material from the load beam to create at least one gap extending through a portion of the load beam; and
    d) locating damping material adjacent to the gap, the damping material having a higher damping coefficient than material of the load beam surrounding the gap and for damping vibration in the load beam.

11. The method of claim 10 wherein the step of locating damping material adjacent to the gap includes locating viscoelastic epoxy within the gap.

12. The method of claim 10 wherein:
    the step of fabricating the load beam includes forming stiffening rails in opposite edges of the rigid region;
    the step of removing material from the load beam to create at least one gap includes removing material from each stiffening rail to form at least one gap in each stiffening rail; and
    the step of locating damping material adjacent to the gap includes locating damping material within each gap in each stiffening rail.

13. The method of claim 10 wherein:
    the step of fabricating the load beam includes forming at least two opposite edges in the surface of the load beam; and
    the step of removing material from the load beam to create at'least one gap includes removing material from between the opposite edges of the load beam to form at least one gap between the opposite edges of the load beam.

14. The method of claim 10 wherein:
    the step of removing material from the load beam to create at least one gap includes removing material from the rigid region of the load beam to form first and second longitudinally extending gaps in the rigid region of the load beam; and
    the step of locating damping material adjacent to the gap includes locating damping material within the first and second longitudinally extending gaps.

15. The method of claim 10 wherein:
    the step of fabricating the load beam includes forming a spring region between the mounting region and the rigid region;
    the step of removing material from the load beam to create at least one gap includes removing material from the spring region to form at least one gap therein; and
    the step of locating damper material adjacent to the gap includes placing damper material over the at least one gap.

16. The method of claim 15 wherein:
    the step of fabricating the load beam includes forming a first edge and a second edge in the spring region;
    the step of removing material from the load beam to create at least one gap includes removing material from the first and second edges of the spring region to form a first gap in the first edge and a second gap in the second edge; and the step of locating damper material adjacent to the gap includes placing a generally U-shaped first damper patch over the first gap and placing a generally U-shaped second damper patch over the second gap.

17. A disk drive suspension comprising:
- a load beam having a proximal end, a distal end, a mounting region on the proximal end, and a rigid region, the load beam also having an upper face and a lower face;
- a flexure at the distal end of the load beam, the flexure configured for receiving and supporting a read/write head;
- at least one exposed edge of the load beam extending between the upper face and the lower face of the load beam, the exposed edge defining an aperture extending entirely through the load beam; and
- damping material in the gap having a higher damping coefficient than material of the load beam surrounding the gap and for damping vibration in the suspension.

18. The disk drive suspension of claim 17 wherein the damping material is a uniform structure free from an added constraint layer.

19. A disk drive suspension comprising:
- a load beam having a proximal end, a distal end, a mounting region on the proximal end, and a rigid region;
- a flexure at the distal end of the load beam, the flexure configured for receiving and supporting a read/write head;
- at least one gap in the load beam and extending entirely through the load beam; and
- damping material extending at least partially over the area of the gap, the damping material having a surface free from contact with a constraint layer, the damping material also having a higher damping coefficient than material of the load beam surrounding the gap and for damping vibration in the suspension.

* * * * *